(12) United States Patent
Akamatsu et al.

(10) Patent No.: US 8,634,090 B2
(45) Date of Patent: Jan. 21, 2014

(54) DATA TRANSFER APPARATUS, DATA TRANSMITTING AND RECEIVING APPARATUS, AND IMAGE FORMING APPARATUS

(75) Inventors: Manabu Akamatsu, Kanagawa (JP); Takeshi Kamimura, Kanagawa (JP); Hirokazu Tsubota, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 800 days.

(21) Appl. No.: 12/880,675

(22) Filed: Sep. 13, 2010

(65) Prior Publication Data

US 2011/0196910 A1   Aug. 11, 2011

(30) Foreign Application Priority Data

Feb. 8, 2010 (JP) ................................. 2010-025472

(51) Int. Cl.
   *G06F 3/12* (2006.01)
   *G06K 15/02* (2006.01)
   *H04N 1/46* (2006.01)
   *H04N 1/32* (2006.01)

(52) U.S. Cl.
   USPC ......... 358/1.15; 358/1.16; 358/501; 358/540; 358/401; 358/426.05; 358/426.06; 358/426.08; 358/426.1; 709/201; 370/470; 370/471; 370/472; 370/474

(58) Field of Classification Search
   None
   See application file for complete search history.

(56) References Cited

U.S. PATENT DOCUMENTS

| 6,560,200 | B1* | 5/2003 | Shinozuka | 370/241 |
| 7,877,531 | B2* | 1/2011 | Yokoyama | 710/72 |
| 7,944,877 | B2* | 5/2011 | Jung et al. | 370/329 |
| 2004/0015604 | A1* | 1/2004 | Osakabe et al. | 709/236 |
| 2009/0238208 | A1 | 9/2009 | Naka | |

FOREIGN PATENT DOCUMENTS

| JP | A-2005-321921 | 11/2005 |
| JP | A-2006-173867 | 6/2006 |

\* cited by examiner

*Primary Examiner* — King Poon
*Assistant Examiner* — Beniyam Menberu
(74) *Attorney, Agent, or Firm* — Oliff & Berridge, PLC (57) ABSTRACT

A data transfer apparatus includes a transmitting unit, a transmission controlling unit, and a generating unit. The transmitting unit transmits transmit data over a transmission channel having a plurality of lines, such that the transmit data are assigned to the plurality of lines by information unit of the transmit data, the information unit. The transmission controlling unit appends control data to transfer data to be transferred to a receiving side to compose the transmit data, the control data being for controlling transmission and reception of the transfer data. The generating unit obtains information about the number of the lines. The generating unit determines, based on the number of the lines and the number of information units of the control data, the number of information units of the transfer data that makes the number of information units of the transmit data integral multiple of the number of the lines.

4 Claims, 6 Drawing Sheets

DATA TRANSFER APPARATUS, DATA TRANSMITTING AND RECEIVING APPARATUS, AND IMAGE FORMING APPARATUS

CROSS-REFERENCE TO RELATED APPLICATIONS

This application is based upon and claims priority under 35 USC 119 from Japanese Patent Application No. 2010-025472, filed Feb. 8, 2010.

BACKGROUND

Technical Field

The present invention relates to a data transfer apparatus, a data transmitting and receiving apparatus, and an image forming apparatus.

SUMMARY OF THE INVENTION

According to an aspect of the invention, a data transfer apparatus includes a transmitting unit, a transmission controlling unit, and a generating unit. The transmitting unit transmits transmit data over a transmission channel having a plurality of lines, such that the transmit data are assigned to the plurality of lines by information unit of the transmit data, the information unit including a plurality of pieces of bit information. The transmission controlling unit appends control data to transfer data to be transferred to a receiving side to compose the transmit data, the control data being for controlling transmission and reception of the transfer data. The generating unit obtains information about the number of the lines in the transmission channel. The generating unit determines, based on the number of the lines and the number of information units of the control data, the number of information units of the transfer data that makes the number of information units of the transmit data integral multiple of the number of the lines. The generating unit generates transfer data of the determined number of information units from a part of the transfer data to be transferred to the receiving side.

BRIEF DESCRIPTION OF THE DRAWINGS

Exemplary embodiments of the invention will be described in detail based on the following figures, wherein.

DETAILED DESCRIPTION

First Exemplary Embodiment

Figure 1:
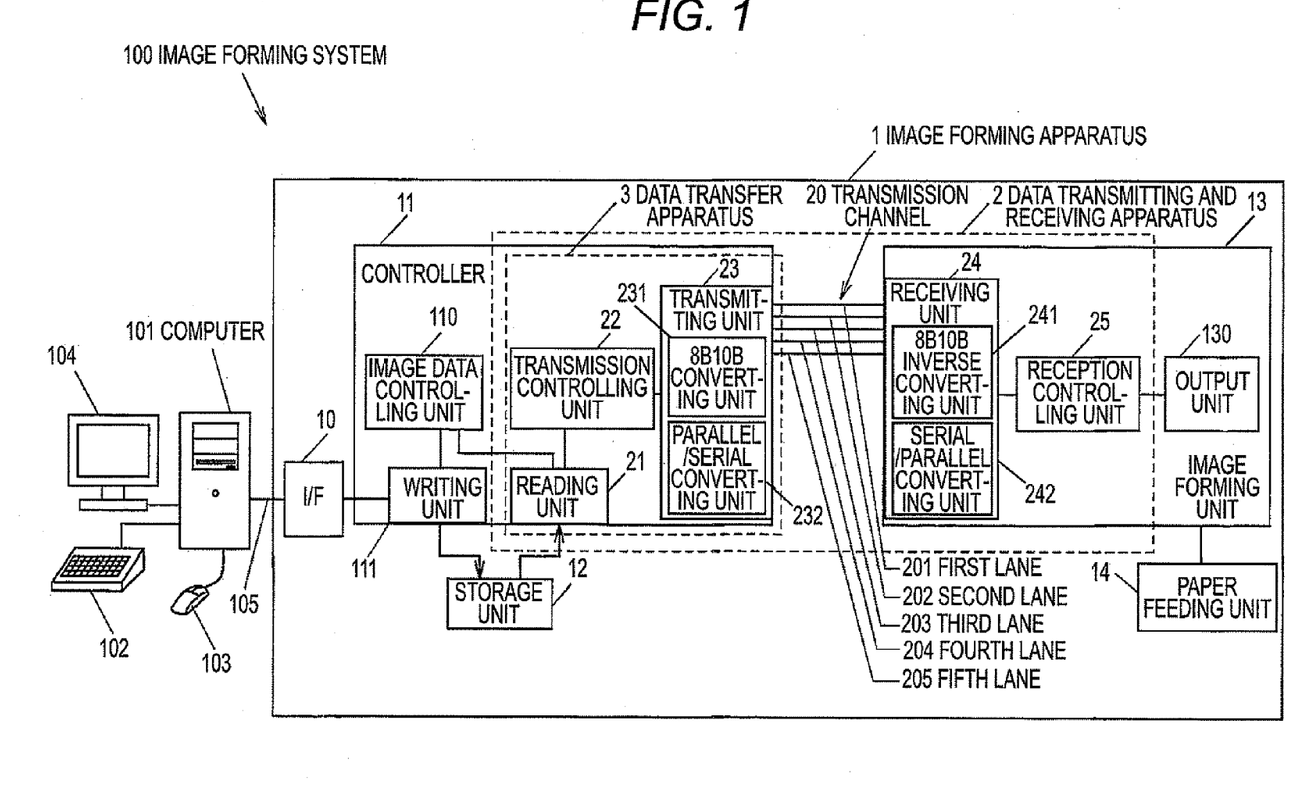
FIG. 1 is an overall view of an image forming system according to a first exemplary embodiment of the present invention.

FIG. 1 is a diagram showing an image forming system according to a first exemplary embodiment to which are applied a data transfer apparatus, a data transmitting and receiving apparatus, and an image forming apparatus of the present invention.

This image forming system 100 includes a computer 101 having input devices such as a keyboard 102 and a mouse 103; a display apparatus 104, such as a liquid crystal display, which is connected to the computer 101; and an image forming apparatus 1 connected to the computer 101 through a communication line 105 such as a LAN (Local Area Network).

The computer 101 is configured to be able to transmit an image data unit which is generated by a user operating the keyboard 102 and the mouse 103, to the image forming apparatus 1 through the communication line 105.

(Configuration of the Image Forming Apparatus)

The image forming apparatus 1 includes an I/F (Interface) unit 10, a controller 11, a storage unit 12, an image forming unit 13, a paper feeding unit 14, and a transmission channel 20 having a first lane to a fifth lane 201 to 205 which are an example of a plurality of lines. A part of the controller 11 and a part of the image forming unit 13 configure a data transmitting and receiving apparatus 2 that transfers data units from the controller 11 to the image forming unit 13. Note that although here the controller 11 and the image forming unit 13 are present in the same apparatus, the configuration is not limited thereto.

The I/F unit 10 is configured by a circuit that receives information transmitted from the computer 101 through the communication line 105 and converts the information into a signal format that is readable by the controller 11.

The controller 11 is configured by a circuit having a CPU for controlling the operation of each unit of the image forming apparatus 1, etc. The controller 11 includes a writing unit 111 that writes an image data unit inputted through the I/F unit 10 into the storage unit 12; a reading unit 21 which is an example of a generating unit that reads a part of the image data unit from the storage unit 12 and thereby generates a transfer data unit; an image data controlling unit 110 that controls the operations of the writing unit 111 and the reading unit 21; a transmission controlling unit 22 that appends control data units for controlling transmission and reception of the transfer data unit, to the transfer data unit generated by the reading unit 21 and thereby composes a transmit data unit; and a transmitting unit 23 that transmits the transmit data unit such that the transmit data unit is assigned to the first to fifth lanes 201 to 205 in the transmission channel 20 in units of information, each of which includes a plurality of pieces of bit information. The reading unit 21, the transmission controlling unit 22, and the transmitting unit 23 are an exemplary configuration of the data transfer apparatus 3.

As used herein, the term "units of information" refers to a unit used to treat a plurality of pieces of bit information as a unity. In the present exemplary embodiment, data including 8-bit information, byte data, is described as one information unit but data including 16-bit information, word data, or information including 32-bit information, double word data, may be treated as one information unit.

The storage unit 12 is, for example, an SRAM, a DRAM, or an HDD. The storage unit 12 is configured to be connected to the writing unit 111 and the reading unit 21 in the controller 11 to be able to store the whole image data.

The image forming unit 13 is an example of the receiving side that accepts transfer of an image data unit from the controller 11, and has an output unit 130 that forms an image according to the image data unit on printing paper (not shown) contained in the paper feeding unit 14. The paper feeding unit 14 is configured to supply sheets of printing paper one by one to the output unit 130 in the image forming unit 13.

(Configuration of the Data Transfer Apparatus)

The data transmitting and receiving apparatus 2 includes the reading unit 21, the transmission controlling unit 22, and the transmitting unit 23 which are provided in the controller 11, a receiving unit 24 and a reception controlling unit 25 which are provided in the image forming unit 13, and the transmission channel 20 having the first to fifth lanes 201 to 205 provided between the controller 11 and the image forming unit 13. Note that the number of a plurality of lanes included in the transmission channel 20 may be an odd number other than 5 or an even number.

The reading unit 21 is configured to obtain information about the number of lanes in the transmission channel 20 from the image data controlling unit 110, determine the number of bytes of a transfer data unit that makes the number of bytes of a transmit data unit an integral multiple of the number of lanes, based on the number of lanes and the number of bytes of control data units which are appended by the transmission controlling unit 22, and read a data unit of the determined number of bytes from an image data to be transferred to the image forming unit 13 and thereby generate a transfer data unit.

Specifically, the reading unit 21 reads, chunk by chunk, from the storage unit 12, an image data unit of such a number of bytes that is obtained by subtracting the number of bytes of control data units which are appended by the transmission controlling unit 22, from a value that is an integral multiple of the number of lanes in the transmission channel 20 (five in the present exemplary embodiment), and thereby generates transfer data units for a plurality of transmissions. A data unit read by the reading unit 21 at a time is a data unit of a plurality of bytes which is one of chunks into which the image data unit is divided. The reading unit 21 generates a read data unit which is read at a time from the storage unit 12, as a transfer data unit to be transferred to the image forming unit 13.

The transmission controlling unit 22 appends control data units including a plurality of byte data units for controlling transmission and reception of a transfer data unit, before and after the transfer data unit generated by the reading unit 21, as a transmit data unit to be transmitted over the transmission channel 20, and thereby composes the transfer data unit and the control data units appended to the transfer data unit.

The transmitting unit 23 has an 8B10B converting unit 231 and a parallel/serial converting unit 232. The 8B10B converting unit 231 converts a transmit data unit from an 8-bit data unit to a 10-bit data unit. The parallel/serial converting unit 232 converts the 10-bit data unit converted by the 8B10B converting unit 231 into a serial signal.

In addition, the transmitting unit 23 transmits the transmit data unit in units of bytes to the receiving unit 24 in the image forming unit 13 by serial communication through the first to fifth lanes 201 to 205. Each of the first to fifth lanes 201 to 205 is configured to transmit a transmit data unit in units of bytes, whereby transmission of a plurality of byte data units is performed in parallel.

The receiving unit 24 receives the transmit data unit transmitted from the transmitting unit 23 over the transmission channel 20. The receiving unit 24 has a serial/parallel converting unit 242 and an 8B10B inverse converting unit 241.

The serial/parallel converting unit 242 converts the received data unit into a parallel signal. The 8B10B inverse converting unit 241 inversely converts the 10-bit data unit converted into the parallel signal by the serial/parallel converting unit 242, into an 8-bit data unit.

The reception controlling unit 25 has an extraction function of extracting the transfer data unit from the transmit data unit, based on the content of the control data units included in the transmit data unit having been subjected to serial/parallel conversion and 8B10B inverse conversion by the receiving unit 24; and a determination function of determining whether there is an error, such as a communication error, in the transmit data unit by analyzing the content of the control data units. The reception controlling unit 25 is configured to request the transmission controlling unit 22 to retransmit the transmit data unit over the transmission channel 20 if it is determined by the determination function that there is an error, and to pass the extracted transfer data unit to the output unit 130 if it is determined that there is no error.

The output unit 130 stores transfer data units transferred from the controller 11 to the image forming unit a plurality of separate times. After all data units required to recompose the image data unit are collected, the output unit 130 combines the stored transfer data units to recompose the image data unit, and forms an image according to the image data unit on printing paper.

The reading unit 21 obtains number-of-lane information A which is used to compute the number of bytes of a transfer data unit, from the image data controlling unit 110 and determines the number of bytes M of a transfer data unit by the following expression, using the number of lanes in the transmission channel 20 and the number of bytes B of control data units which are appended by the transmission controlling unit 22:

$$M = A \times N - B \quad (1)$$

where N is a positive integer greater than or equal to (B/A).

When the value of the integer N is increased, the ratio of a transfer data unit to a transmit data unit increases and accordingly transfer data transmission efficiency increases; however, when a communication error occurs and thus the transmit data unit is retransmitted, it requires a long time to retransmit the data unit. On the other hand, when the value of the integer N is reduced, the ratio of a transfer data unit to a transmit data unit decreases and accordingly transmission efficiency decreases. It is desirable to set the integer N such that the number of bytes M is, for example, between 300 bytes to 1000 bytes. For example, when the number of lanes A is 5 and the number of bytes B of control data units is 28 bytes, if the integer N is set to 108, then the number of bytes M is 512.

Note that, when the number of lanes through which data units are transmittable from the transmitting unit 23 on the side of the controller 11 differs from the number of lanes through which data units are receivable by the receiving unit 24 on the side of the image forming unit 13, the image data controlling unit 110 provides information about the smaller number of lanes to the reading unit 21.

(Hierarchical Structure of Communication Functions)

Figure 2:
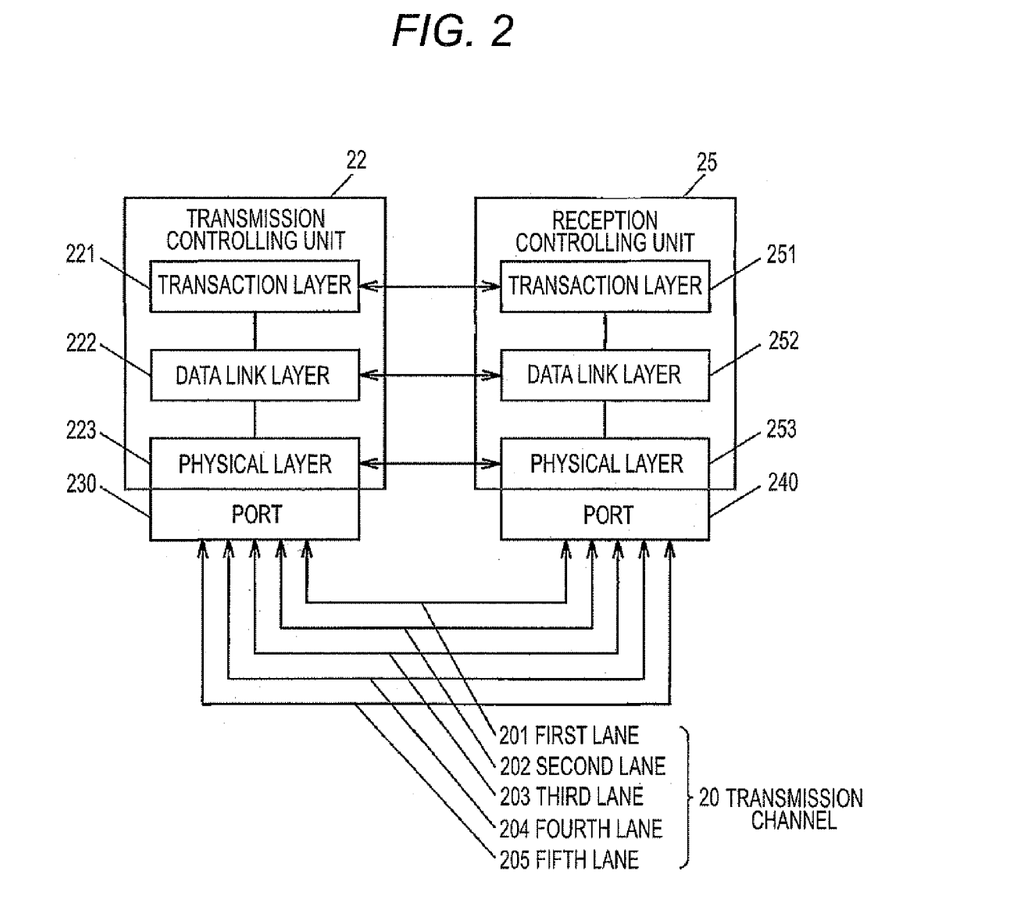
FIG. 2 is a diagram showing a hierarchical structure of communication performed by a data transfer apparatus according to the first exemplary embodiment of the present invention.

FIG. 2 is a diagram showing the communication functions of the transmission controlling unit 22, the transmitting unit 23, the receiving unit 24, and the reception controlling unit 25 in the form of a hierarchical structure.

Figure 3:
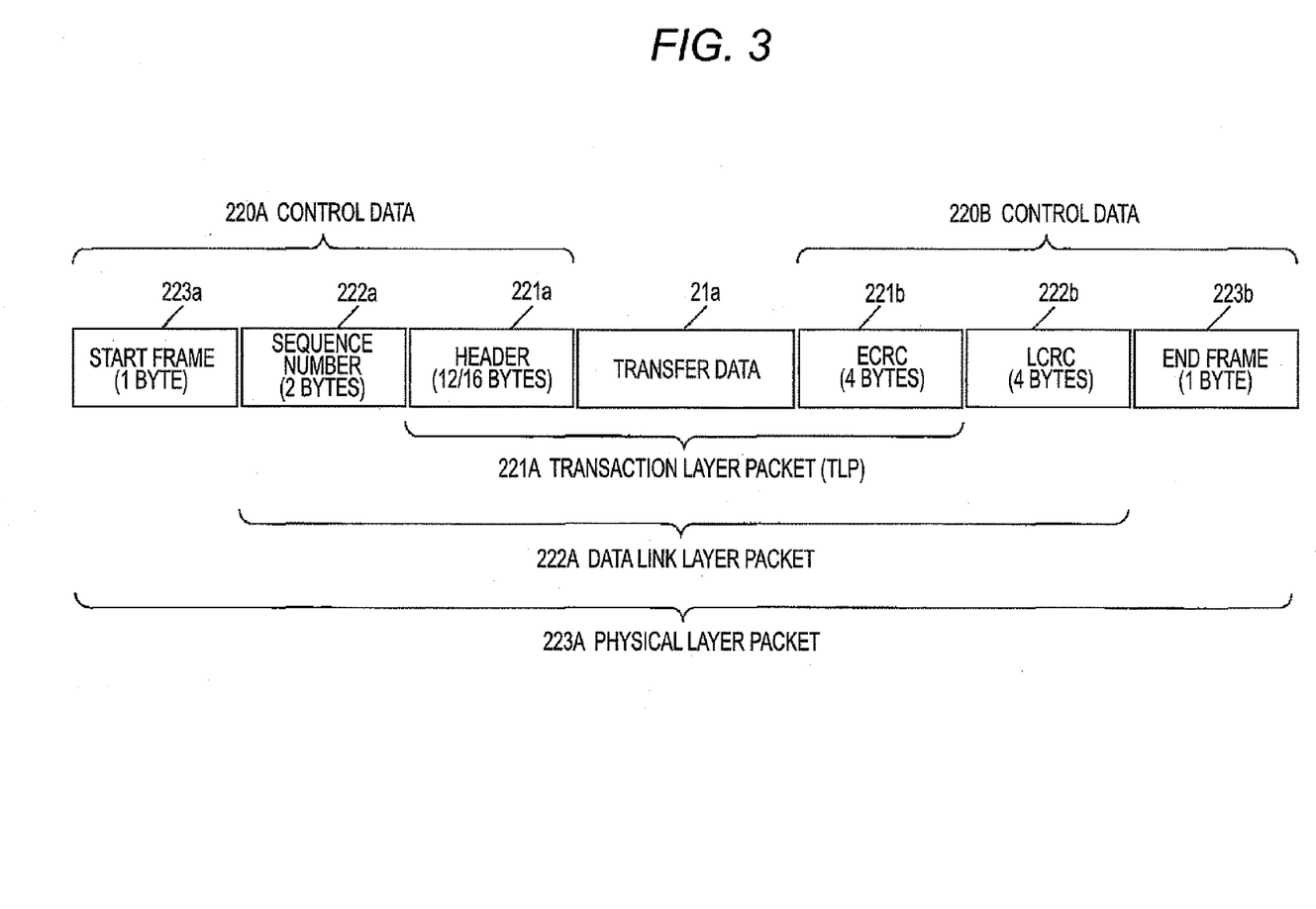
FIG. 3 is a diagram showing exemplary configurations of packets according to the first exemplary embodiment of the present invention.

FIG. 3 is a diagram showing a structure of a transmit data unit which is transmitted from the transmitting unit 23. The hierarchical structure and the transmit data structure conform to the PCI Express standard.

The communication function of the transmission controlling unit 22 includes a transaction layer 221, a data link layer 222, and a physical layer 223. The transmitting unit 23 is configured as a port 230 having a differential transmission circuit, etc., included in the physical layer 223.

The communication function of the reception controlling unit 25 includes a transaction layer 251, a data link layer 252, and a physical layer 253. The receiving unit 24 is configured as a port 240 having a differential reception circuit, etc., included in the physical layer 253.

The transaction layers 221 and 251 have packet assembly and disassembly functions. As shown in FIG. 3, the transaction layer 221 of the transmission controlling unit 22 appends a header 221a of 12 bytes or 16 bytes before a transfer data unit 21a obtained from the reading unit 21 and appends a 4-byte ECRC (End-to-End Cyclic Redundancy Check) data unit 221b after the transfer data unit 21a, and thereby constructs a Transaction Layer Packet (TLP) 221A. The header 221a is data representing the packet characteristics of the TLP such as header length and priority. The ECRC 221b is data for detecting an error in data by a cyclic redundancy check.

The data link layers 222 and 252 play a main role in ensuring the integrity of the data units of the transaction layer packet 221A by error detection and correction (retransmission), and further mutually perform packet exchange for flow control, etc. The data link layer 222 of the transmission controlling unit 22 further appends a 2-byte sequence number 222a before the transaction layer packet 221A and appends a 4-byte LCRC (Link Cyclic Redundancy Check) data unit 222b after the transaction layer packet 221A, and thereby constructs a data link layer packet 222A. The sequence number 222a is data representing the order of transmission of the TLP, and the LCRC 222b is data for a cyclic redundancy check by the data link layer.

The physical layers 223 and 253 have circuits required for communication, such as a driver and a buffer. The physical layer 223 of the transmission controlling unit 22 further appends a 1-byte start frame 223a before the data link layer packet 222A and appends a 1-byte end frame 223b after the data link layer packet 222A, and thereby constructs a physical layer packet 223A. The physical layer packet 223A corresponds to a transmit data unit.

A control data unit 220A including the start frame 223a, the sequence number 222a, and the header 221a, and a control data unit 220B including the ECRC 221b, the LCRC 222b, and the end frame 223b are examples of control data units for controlling transmission and reception of the transfer data unit 21a. In the example shown in FIG. 3, the number of bytes of the control data units 220A and 220B is 24 bytes (when the header 221a has 12 bytes) or 28 bytes (when the header 221a has 16 bytes).

The reception controlling unit 25 processes the transmit data unit transmitted from the transmitting unit 23 in the order of the physical layer 223, the data link layer 222, and the transaction layer 221 and extracts the transfer data unit 21a, excluding the control data units appended by the transmission controlling unit 22. If an error in cyclic redundancy checks or sequence number inconsistency is found, then the reception controlling unit 25 requests the side of the controller 11 to retransmit the transmit data unit.

Each of the first to fifth lanes 201 to 205 in the transmission channel 20 is a set of pairs of differential signal lines of, for example, 0.8 volts, including a pair of signal lines on the transmitting side and a pair of signal lines on the receiving side. Each of the first to fifth lanes 201 to 205 is configured to be able to perform not only data transfer from the controller 11 to the image forming unit 13 but also data transmission from the image forming unit 13 to the controller 11. The transmission channel 20 which puts the first to fifth lanes 201 to 205 together corresponds to a "link" in the PCI Express standard.

(Functions of the Transmitting Unit and the Receiving Unit)

Figure 4:
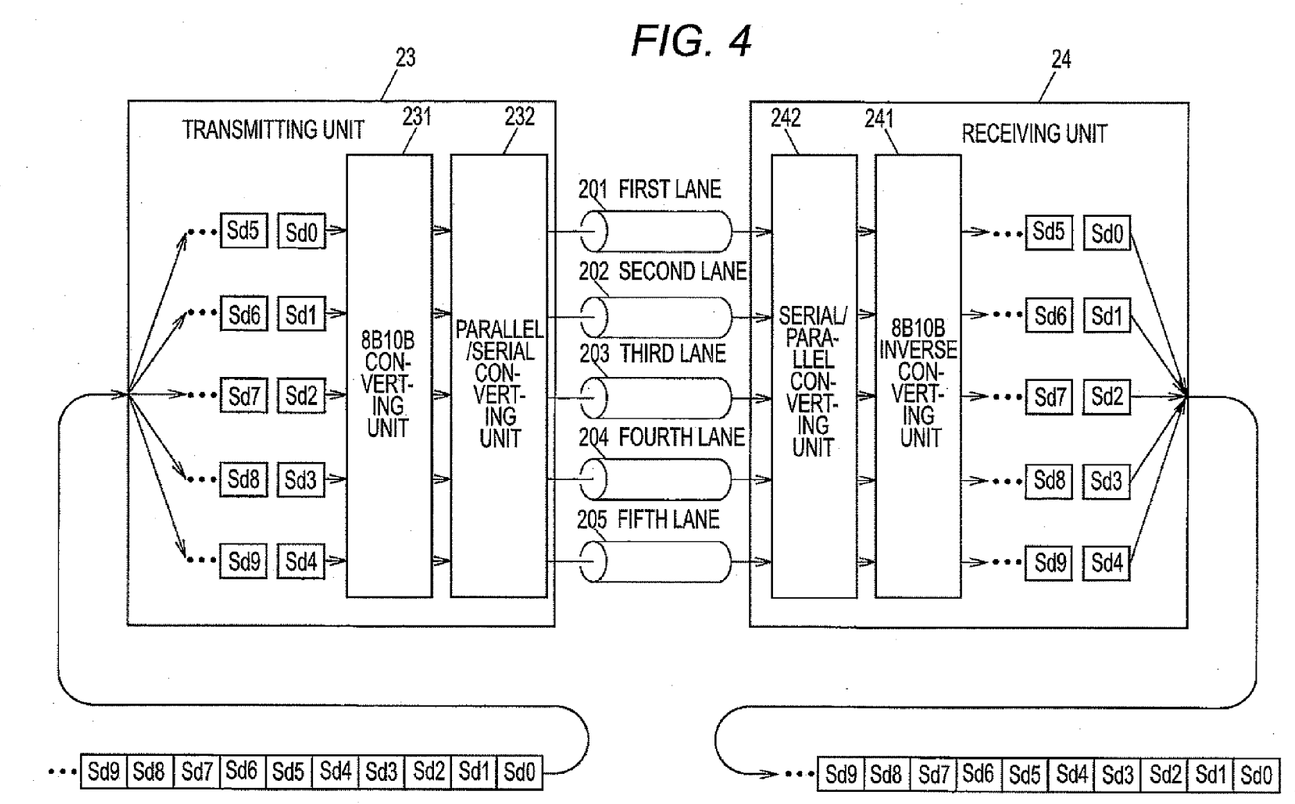
FIG. 4 is a diagram for explaining an example of a data transmission method according to the first exemplary embodiment of the present invention.

FIG. 4 is a diagram showing the functions of transmitting and receiving a transmit data unit by the transmitting unit 23 and the receiving unit 24. In the drawing, the first 1 byte of a transmit data unit is represented by "Sd0" and subsequent bytes of the transmit data unit are represented by "Sd1", "Sd2", . . . . For example, when the transmit data unit shown in FIG. 3 is transmitted, the start frame 223a corresponds to "Sd0" and the sequence number 222a corresponds to "Sd1" and "Sd2".

The transmitting unit 23 is configured as follows. Specifically, when the transmitting unit 23 starts transmission, the transmitting unit 23 assigns the first 5-byte data units ("Sd0" to "Sd4") of a transmit data unit to the first to fifth lanes 201 to 205, respectively. Then, the 8B10B converting unit 231 performs 8B10B conversion on the byte data units. Furthermore, the parallel/serial converting unit 232 converts the byte data units to serial data units. Then, the serial data units are transmitted through the first to fifth lanes 201 to 205 by serial communication. As used herein, the term "8B10B conversion" refers to the conversion of an 8-bit byte data unit to a 10-bit data unit where there are less consecutive "0s" or "1s". The 8B10B conversion is performed to prevent a cross point between differential signals which serve as reference signals for generating a clock used to detect a signal by the receiving unit 24, from existing for a long period of time.

After the transmitting unit 23 assigns the first 5-byte data units ("Sd0" to "Sd4") of the transmit data unit to the first to fifth lanes 201 to 205, the transmitting unit 23 assigns 5-byte data units ("Sd5" to "Sd9") subsequent to the first 5-byte data units to the first to fifth lanes 201 to 205, respectively. The data units assigned to the lanes 201 to 205, respectively, are subjected to 8B10B conversion and parallel/serial conversion and then sequentially transmitted. The transmitting unit 23 is configured to repeatedly perform conversion and transmission on a 5-byte basis until transmission of all the data units of the transmit data unit is completed.

The receiving unit 24 is configured as follows. Specifically, the receiving unit 24 receives 10-bit data units transmitted through the first to fifth lanes 201 to 205. Then, the serial/parallel converting unit 242 converts the data units to parallel data units. The 8B10B inverse converting unit 241 inversely converts each of the parallel data units from a 10-bit data unit to an 8-bit byte data unit. Furthermore, the converted byte data units are recombined to reproduce the transmit data unit.

The reception controlling unit 25 extracts a transfer data unit from the reproduced transmit data unit and passes the transfer data unit to the output unit 130. The output unit 130 is configured to recompose an image data unit generated by the computer 101, based on transfer data units and form an image according to the image data unit on printing paper.

(Operation of the Image Forming System)

Next, the operation of the image forming system 100 will be described with reference to FIGS. 1 to 6.

When a user operates the keyboard 102 and the mouse 103 to allow the computer 101 to create an image and then provides an instruction to print the image by, for example, operating the mouse 103, the computer 101 transmits information representing the image created by the user, as an image data unit, to the image forming apparatus 1 through the communication line 105.

The I/F 10 in the image forming apparatus 1 receives a transmit signal from the computer 101, converts the signal into a signal format that is readable by the controller 11, and outputs the signal. The controller 11 obtains the image data unit through the I/F 10 and the writing unit 111 stores the image data unit in the storage unit 12. The number of bytes of the image data unit is 1 megabyte in the case of, for example, an A4 size, 24-bit color image.

When the image data unit is stored in the storage unit 12, the image data controlling unit 110 in the controller 11 instructs the reading unit 21 to read the image data unit from the storage unit 12. At this time, the image data controlling unit 110 provides information about the number of lanes in the transmission channel 20 (five in the present exemplary embodiment) to the reading unit 21.

The reading unit 21 obtains the information about the number of lanes in the transmission channel 20 from the image data controlling unit 110. Then, the reading unit 21 reads from the storage unit 12 an image data unit of such a number of bytes that is obtained by subtracting the number of bytes of control data units which are appended by the transmission controlling unit 22, from a value that is an integral multiple of the number of lanes, and thereby generates a transfer data unit. The reading unit 21 performs the process of reading the image data unit from the storage unit 12 a plurality of separate times such that the image data unit is divided into chunks of such a number of bytes that is determined based on the aforementioned expression, until completing the reading of all the image data unit; generating transfer data units for such a number of transmissions that corresponds to the number of the readings; and sequentially passing the transfer data units to the transmission controlling unit 22.

Then, as shown in FIGS. 2 and 3, the transmission controlling unit 22 appends control data units including a header 221a, an ECRC 221b, a sequence number 222a, an LCRC 222b, a start frame 223a, and an end frame 223b, to each transfer data unit by the processes of the transaction layer 221, the data link layer 222, and the physical layer 223.

Subsequently, as shown in FIG. 4, the transmitting unit 23 assigns a transmit data unit including a transfer data unit and control data units appended to the transfer data unit, to the first to fifth lanes 201 to 205 in units of bytes, performs 8B10B conversion and parallel/serial conversion on the transmit data unit, and transmits the converted transmit data unit.

At this time, the number of bytes of the transmit data unit is the sum (M+B) of the number of bytes M read by the reading unit 21 at a time and the number of bytes B of the control data units, and is equal to the product of the number of lanes A and the integer N (M+B=A×N). Therefore, there is no need to transmit unnecessary data units to some of the lanes and transmission of the transmit data unit completes by N transmissions.

The receiving unit 24 receives the data units transmitted through the first to fifth lanes 201 to 205, performs serial/parallel conversion by the serial/parallel converting unit 242 and 8B10B inverse conversion by the 8B10B inverse converting unit 241 on the data units, and passes the data units to the reception controlling unit 25.

The reception controlling unit 25 performs cyclic redundancy checks based on the ECRC 221b and the LCRC 222b and a sequence number consistency check based on the sequence number 222a after receiving the whole transmit data. If there is no error, then the reception controlling unit 25 extracts the transfer data unit from the transmit data unit. If there is an error, then the reception controlling unit 25 requests the transmission controlling unit 22 to retransmit the transmit data unit over the transmission channel 20. In response to the request, the transmission controlling unit 22 retransmits the transmit data unit.

The output unit 130 obtains transfer data units from the reception controlling unit 25 and stores the transfer data units. After all data units required to recompose the image data unit are collected, the output unit 130 combines the stored transfer data units to recompose the image data unit, and outputs an image according to the image data unit onto printing paper.

Note that an image data unit that is the last one to be read from the storage unit 12 by the reading unit 21 as a transfer data unit may not always have such a number of bytes that is determined by the aforementioned expression; thus, upon transmission of a transfer data unit which is the last one to be transferred from the data transfer apparatus 3, data units that do not contribute to image formation may be transmitted through some of the first to fifth lanes 201 to 205.

Figure 5:
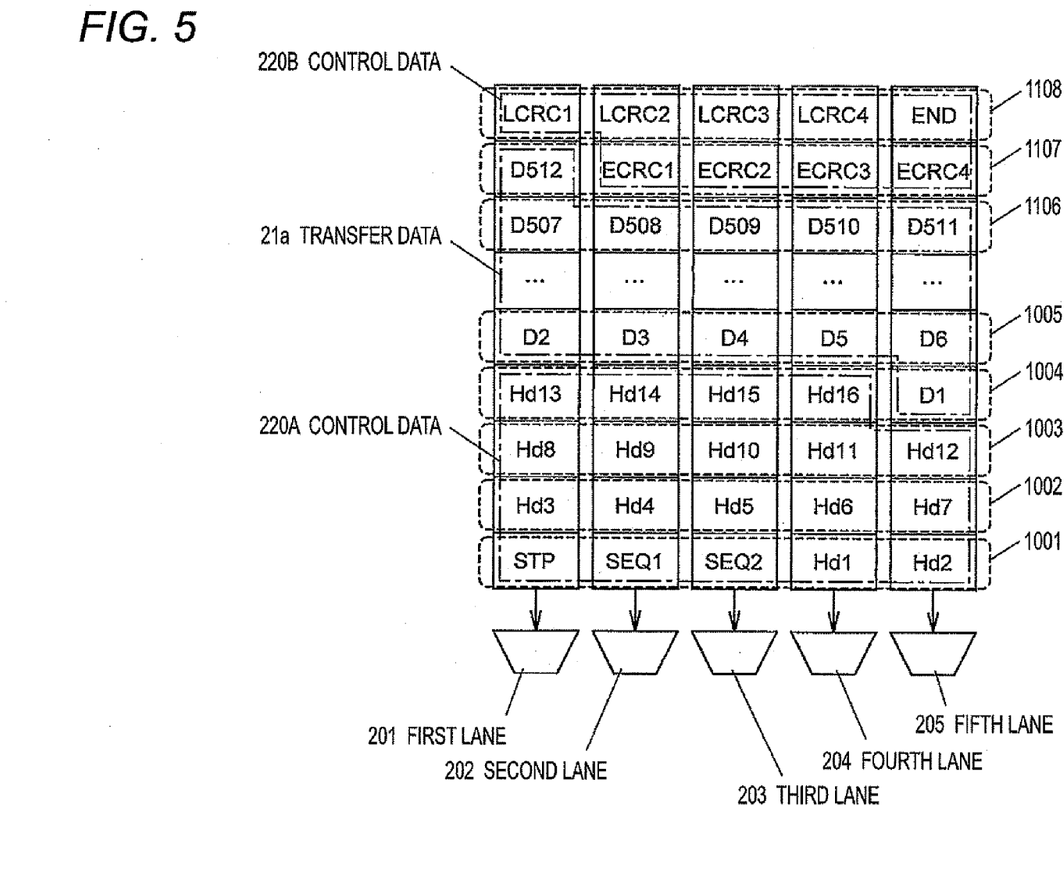
FIG. 5 is a diagram showing an example in which a transmit data unit is assigned to a plurality of lanes, according to the first exemplary embodiment of the present invention.

FIG. 5 is a diagram showing an example of lane mapping for when a 540-byte transmit data unit where 28-byte control data units are appended to a 512-byte transfer data unit is transmitted assigned to the first to fifth lanes 201 to 205.

In the drawing, "STP" indicates the start frame 223a shown in FIG. 3, "SEQ1" and "SEQ2" indicate the sequence number 222a, and "Hd1" to "Hd16" indicate the header 221a, which are the control data unit 220A. "D1" to "D512" indicate the transfer data unit 21a. "ECRC1" to "ECRC4" indicate the ECRC 221b, "LCRC1" to "LCRC4" indicate the LCRC 222b, and "END" indicates the end frame 223b, which are the control data unit 220B.

The first part of a transmit data unit indicated by reference numeral 1001 in FIG. 5 includes "STP", "SEQ1", "SEQ2", "Hd1", and "Hd2". The transmitting unit 23 assigns "STP" to the first lane 201, and thereafter likewise assigns "SEQ1" to the second lane 202, "SEQ2" to the third lane 203, "Hd1" to the fourth lane 204, and "Hd2" to the fifth lane 205. The transmitting unit 23 performs transmission of these byte data units in parallel.

Subsequent to the transmission of the first part 1001 of the transmit data unit, the transmitting unit 23 transmits the second part 1002 ("Hd3" to "Hd7") of the transmit data unit through the first to fifth lanes 201 to 205. Thereafter, likewise, the transmitting unit 23 sequentially performs transmission of the third part 1003 ("Hd8" to "Hd12") of the transmit data unit, the fourth part 1004 ("Hd13" to "Hd16" and "D1") of the transmit data unit, and the fifth part 1005 ("D2" to "DG") of the transmit data unit.

By transmission of the 106th part 1106 ("D507" to "D511") of the transmit data unit and the 107th part 1107 ("D512" and "ECRC1" to "ECRC4") of the transmit data unit, transmission of the 512-byte transfer data unit 21a and the ECRC 221b is completed. By transmission of the 108th part 1108 ("LCRC1" to "LCRC4" and "END") of the transmit data unit, transmission of the LCRC 222b and the end frame 223b is completed. As such, by 108 transmissions, transmission of all the transmit data unit is completed and an unnecessary data unit is not included in any part of the transmit data unit for the respective transmissions.

Figure 6:
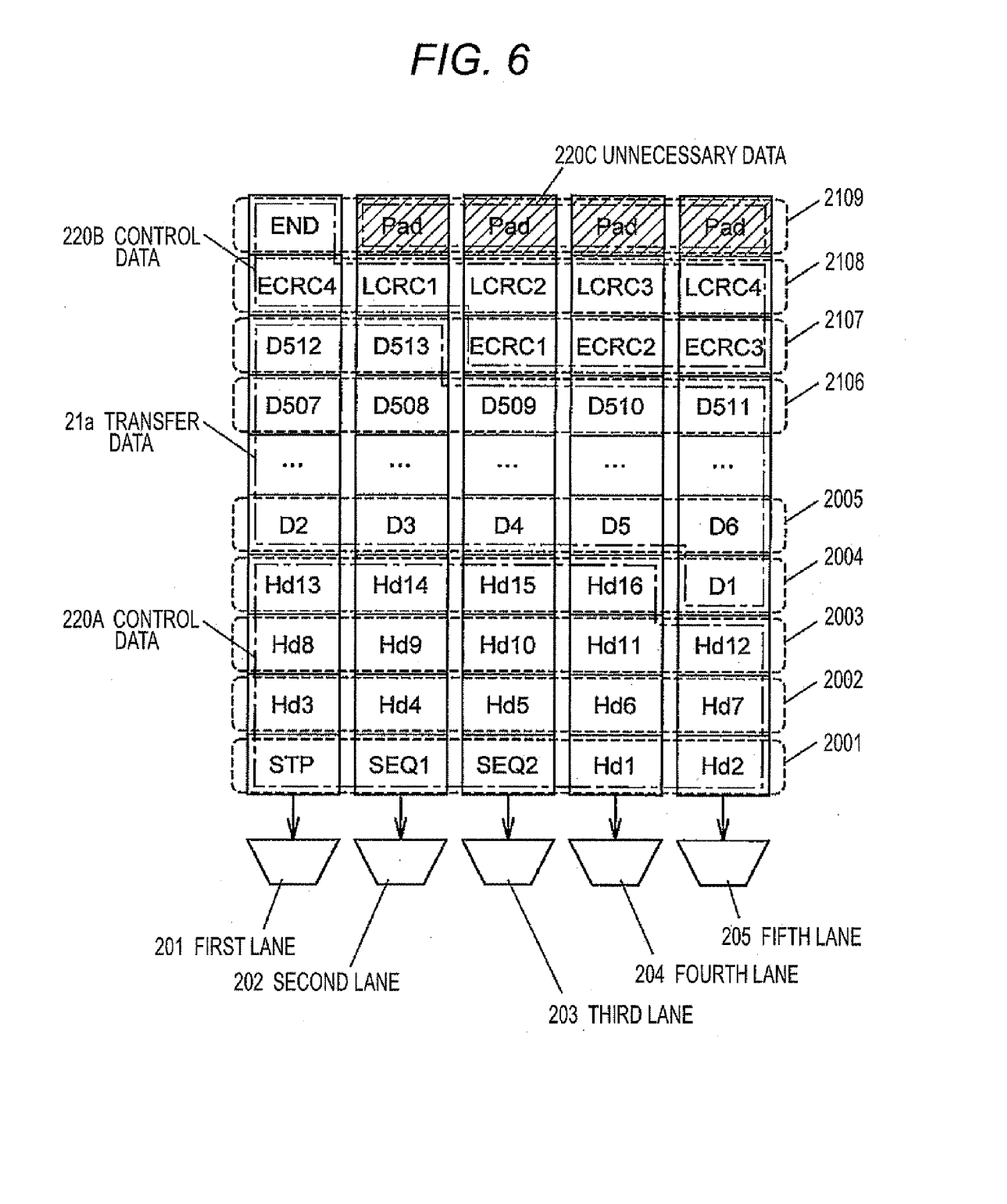
FIG. 6 is a diagram showing an example in which a transmit data unit is assigned to the plurality of lanes, which is a comparative example.

FIG. 6 is a diagram showing a comparative example of lane mapping for when a transmit data unit including a 513-byte transfer data unit 21b is transmitted through the first to fifth lanes 201 to 205.

The contents of the first to fifth parts 2001 to 2005 of a transmit data unit and the contents of the 106th part 2106 of the transmit data unit in FIG. 6 are the same as the contents of the first to fifth parts 1001 to 1005 of the transmit data unit and the contents of the 106th part 1106 of the transmit data unit in FIG. 5; however, the 107th part 2107 of the transmit data unit includes "D513" which is a transfer data unit of the 513th byte, and thus, the lanes to which subsequent parts of the transmit data unit are assigned are shifted by one position. Then, the end frame "END" is assigned to the first lane 201 in the 109th part 2109 of the transmit data unit, and "Pad" indicating an unnecessary data unit 220C is assigned to the second to fifth lanes 202 to 205. As such, by the increase of a transfer data unit by 1 byte, the number of transmissions is increased by one, i.e., from 108 to 109.

Second Exemplary Embodiment

Next, a second exemplary embodiment of the present invention will be described. In the first exemplary embodiment, description is made of the case in which the number of lanes through which data units are transmittable from the transmitting unit and the number of lanes through which data units are receivable by the receiving unit are both five. In the present exemplary embodiment, on the other hand, the number of lanes on the transmitting side differs from the number of lanes on the receiving side. In the present exemplary embodiment, the image data controlling unit is configured to obtain information about the number of lanes on the receiving side and provide information about the smaller one of the numbers of lanes on the transmitting side and the receiving side to the reading unit. Therefore, even when an image forming unit of a model with a different number of lanes is connected to the controller, by adjusting the number of bytes of a transfer data unit according to the number of lanes through which data units are transmittable, the number of transmissions of unnecessary data units is reduced.

Third Exemplary Embodiment

Next, a third exemplary embodiment of the present invention will be described. In the first exemplary embodiment, the case in which the number of lanes in the transmission channel is five is described. In the present exemplary embodiment, on the other hand, the number of lanes is 4, 8, 12, 16, or 32. Even if the number of lanes is thus changed, a transfer data unit is computed according to the number of lanes and thus the number of bytes of a transfer data unit that does not cause the need to transmit unnecessary data may be determined. Note that in the PCI Express standard, 1, 2, 4, 8, 12, 16, and 32 lanes are defined.

Fourth Exemplary Embodiment

Next, a fourth exemplary embodiment of the present invention will be described. Although in the above-described exemplary embodiments the number of bytes of a transfer data unit is computed based on the number of lanes, in the present exemplary embodiment, the reading unit stores a correspondence table between the number of lanes and a transfer data unit, and determines the number of bytes of a transfer data unit based on the correspondence table. Alternatively, the number of bytes of a transfer data unit may be specified by the image data controlling unit.

Other Exemplary Embodiments

Note that the present invention is not limited to the above-described exemplary embodiments and may also be applied to, for example, systems or apparatuses other than image forming systems. In addition, various modifications may be made in the present invention without changing the nature or the scope of the invention. For example, lanes that form a transmission channel are not limited to differential signal lines. The transmission channel may use an optical fiber, etc., or wireless transmission may be applied. In addition, the transmission channel is not limited to those conforming to the PCI Express standard.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. A data transfer apparatus comprising:
   a transmitting unit that transmits transmit data over a transmission channel having a plurality of lines, such that the transmit data are assigned to the plurality of lines by information unit of the transmit data, the information unit including a plurality of pieces of bit information;
   a transmission controlling unit that appends control data to transfer data to be transferred to a receiving side to compose the transmit data, the control data being for controlling transmission and reception of the transfer data; and
   a generating unit that obtains information about the number of the lines in the transmission channel, that determines, based on the number of the lines and the number of information units of the control data, the number of information units of the transfer data that makes the number of information units of the transmit data integral multiple of the number of the lines, and that generates transfer data of the determined number of information units from a part of the transfer data to be transferred to the receiving side.

2. The data transfer apparatus according to claim 1, wherein the generating unit generates the transfer data by reading, chunk by chunk, a data unit of the number of information units corresponding to a numeric value, from a storage unit that stores the transfer data to be transferred to the receiving side, the numeric value being obtained by subtracting the number of information units of the control data units from a numeric value which is an integral multiple of the number of the lines in the transmission channel.

3. A data transmitting and receiving apparatus comprising:
   a transmission channel that has a plurality of lines;
   a transmitting unit that transmits transmit data over the transmission channel, such that the transmit data are assigned to the plurality of lines by information unit of the transmit data, the information unit including a plurality of pieces of bit information;
   a transmission controlling unit that appends control data to transfer data to be transferred to a receiving side to compose the transmit data, the control data being for controlling transmission and reception of the transfer data;
   a generating unit that obtains information about the number of the lines in the transmission channel, that determines, based on the number of the lines and the number of information units of the control data, the number of information units of the transfer data that makes the number of information units of the transmit data integral multiple of the number of the lines, and that generates transfer data of the determined number of information units from a part of the transfer data to be transferred to the receiving side;

a receiving unit that receives the transmit data transmitted from the transmitting unit over the transmission channel; and a reception controlling unit that extracts the transfer data unit from the transmit data received by the receiving unit.

4. An image forming apparatus comprising:

a storage unit that stores image data;

a transmission channel that has a plurality of lines;

a transmitting unit that transmits the image data as transmit data over the transmission channel, such that the transmit data are assigned to the plurality of lines by information unit of the transmit data, the information unit including a plurality of pieces of bit information;

a transmission controlling unit that appends control data to transfer data to be transferred to a receiving side to compose the transmit data, the control data being for controlling transmission and reception of the transfer data;

a generating unit that obtains information about the number of the lines in the transmission channel, that determines, based on the number of the lines and the number of information units of the control data, the number of information units of the transfer data that makes the number of information units of the transmit data integral multiple of the number of the lines, and that generates transfer data of the determined number of information units from a part of the transfer data to be transferred to the receiving side;

a receiving unit that receives the transmit data transmitted from the transmitting unit over the transmission channel;

a reception controlling unit that extracts the transfer data from the transmit data received by the receiving unit; and an output unit that recombines the transfer data extracted by the reception controlling unit, to recompose the image data, and forms an image based on the image data.

* * * * *